(12) United States Patent
Johnson (10) Patent No.: US 11,617,703 B2
(45) Date of Patent: Apr. 4, 2023

(54) CUP HOLDER ASSEMBLY FOR A PORTABLE WALKING APPARATUS

(71) Applicant: Sherry Johnson, North Lauderdale, FL (US)

(72) Inventor: Sherry Johnson, North Lauderdale, FL (US)

( * ) Notice: Subject to any disclaimer, the term of this patent is extended or adjusted under 35 U.S.C. 154(b) by 17 days.

(21) Appl. No.: 17/493,828

(22) Filed: Oct. 4, 2021

(65) Prior Publication Data

US 2022/0023135 A1    Jan. 27, 2022

Related U.S. Application Data

(63) Continuation-in-part of application No. 16/653,980, filed on Oct. 15, 2019, now Pat. No. 11,135,125.

(51) Int. Cl.
    *A61H 3/02*      (2006.01)
    *F16M 13/02*      (2006.01)
    *A61H 3/00*      (2006.01)

(52) U.S. Cl.
    CPC .............. *A61H 3/02* (2013.01); *A61H 3/00* (2013.01); *F16M 13/022* (2013.01); *A61H 2003/002* (2013.01); *A61H 2201/0107* (2013.01)

(58) Field of Classification Search
    CPC ...... A61H 2003/002; A61H 3/02; A61H 3/00; A61H 2201/0107; F16M 13/022
    See application file for complete search history.

(56) References Cited

U.S. PATENT DOCUMENTS

| | | | |
|---|---|---|---|
| 2,926,879 | A | 3/1960 | Dietrich |
| 3,734,439 | A | 5/1973 | Wintz |
| 4,131,259 | A | 12/1978 | Franks |
| 4,570,835 | A | 2/1986 | Criqui |
| 4,844,399 | A | 7/1989 | Harm |
| 4,887,784 | A | 12/1989 | Kayali |
| 5,056,545 | A | 10/1991 | Spaeth |
| 5,190,257 | A | 3/1993 | Gradei |
| 5,217,032 | A | 6/1993 | Jobst |
| 5,320,263 | A | 6/1994 | Kobylack |
| 5,474,273 | A | 12/1995 | Vinal |

(Continued)

FOREIGN PATENT DOCUMENTS

GB      2473830 A      3/2011

*Primary Examiner* — Brian D Nash
(74) *Attorney, Agent, or Firm* — Mark C. Johnson; Johnson |Dalal (57) ABSTRACT

A cup holder assembly for a portable and handheld walking apparatus that includes a fastener assembly with an annular clasp operably configured to selectively translate to increase and decrease in diameter an annular recess defined thereon for receiving and retaining a portable and handheld walking apparatus. The cup holder assembly also includes a first hinge member directly coupled to the annular clasp and a second hinge member hingedly coupled to the first hinge member, wherein the second hinge member is operably configured to rotate and have at least one locked position along a rotation path with respect to the annular clasp. The assembly includes a cantilevered support rod with a portion directly coupled to the second hinge member and having a terminal distal end and a cylindrical container member and a container fastener configured to couple with the cantilevered support rod.

16 Claims, 6 Drawing Sheets

(56) References Cited

U.S. PATENT DOCUMENTS

| | | |
|---|---|---|
| 5,484,129 A | 1/1996 | Megal |
| 5,640,986 A * | 6/1997 | Herman .................. A61H 3/02 |
| | | 135/69 |
| 5,803,327 A | 9/1998 | Nipper et al. |
| 5,816,648 A | 10/1998 | Baccill |
| 5,996,957 A | 12/1999 | Kurtz |
| 6,073,897 A | 6/2000 | Warren |
| 6,164,305 A * | 12/2000 | Herman .................. A61H 3/02 |
| | | 135/69 |
| 6,390,427 B1 | 5/2002 | McConnell |
| 6,601,813 B1 | 8/2003 | Kager |
| 6,766,912 B1 | 7/2004 | Gibbs |
| 6,896,231 B1 | 5/2005 | Sullivan |
| 6,983,918 B1 | 1/2006 | Leasure |
| 7,021,324 B1 | 4/2006 | Clay et al. |
| 7,087,002 B2 | 8/2006 | Montgomery |
| 7,422,188 B1 | 9/2008 | Schlosser |
| 8,245,719 B2 | 8/2012 | Kirby |
| 8,261,954 B2 | 9/2012 | Lee |
| 8,500,076 B2 | 8/2013 | Lai |
| 8,870,044 B1 | 10/2014 | Freese |
| 8,894,030 B2 | 11/2014 | Nixon |
| 9,345,353 B2 | 5/2016 | Forbes |
| 9,615,683 B2 | 4/2017 | Peacock |
| 9,642,485 B2 | 5/2017 | Kuznicki |
| 9,677,594 B1 * | 6/2017 | Hemmerlin ............ F16M 13/02 |
| 9,950,731 B2 | 4/2018 | Kim |
| 9,956,139 B2 | 5/2018 | Hesketh |
| 10,143,614 B1 | 12/2018 | Pelletier |
| 10,470,356 B2 | 11/2019 | Lundaas |
| 10,470,536 B1 * | 11/2019 | Lundaas .................. A45B 3/00 |
| 10,531,755 B1 | 1/2020 | Huang |
| 10,588,812 B2 | 3/2020 | Brockway |
| 10,655,781 B2 | 5/2020 | Huang |
| 2002/0148868 A1 | 10/2002 | Dion-Bildstein et al. |
| 2002/0179131 A1 * | 12/2002 | Johnson .................. A61H 3/00 |
| | | 135/66 |
| 2003/0019992 A1 | 1/2003 | Webb |
| 2003/0197104 A1 | 10/2003 | Heybl |
| 2005/0236531 A1 | 10/2005 | Joeckel |
| 2007/0029745 A1 | 2/2007 | Ursettie |
| 2010/0230555 A1 * | 9/2010 | Edinger ............ F16M 11/2035 |
| | | 248/104 |
| 2013/0134266 A1 | 5/2013 | Lai |
| 2013/0306119 A1 | 11/2013 | Catchings |
| 2015/0001359 A1 | 1/2015 | Catchings |
| 2016/0081505 A1 | 3/2016 | Berg |
| 2018/0335177 A1 * | 11/2018 | Black ...................... F16G 11/06 |
| 2019/0029913 A1 | 1/2019 | Brockway |
| 2019/0240106 A1 * | 8/2019 | Kapec ...................... A61H 3/04 |

* cited by examiner

CUP HOLDER ASSEMBLY FOR A PORTABLE WALKING APPARATUS

FIELD OF THE INVENTION

The present invention relates generally to removably couplable cup holders, and, more particularly, relates to a cup holder operably configured to selectively couple and uncouple to crutch, walker or other similar structure for said purposes.

BACKGROUND OF THE INVENTION

Many elderly and/or disabled individuals utilize crutches, walkers, wheelchairs, and other similar structures (hereinafter singularly referred as a "portable and handheld walking apparatus") to facilitate in moving around or walking. Many of these users, however, desire to carry around drinks, food, and/or other personal items, but their utilization of the portable and handheld walking apparatus prevents them from safely doing so.

In attempts to solve this problem, some known devices utilizing various different clamping structures and container receptacles that may be configured for attachment to a portable and handheld walking apparatus. One exemplary device is depicted and described in Wintz, U.S. Pat. No. 3,734,439. This device, like others, is not specifically intended for use with a portable and handheld walking apparatus. As such, its functionality may cause safety risks for users utilizing a portable and handheld walking apparatus. More specifically, it is unable to effectively and efficiently retract into a storing position when not desired for use by a user. It is also not safely, effectively, and efficiently removable and attachable to the conventional tubular structure of a portable and handheld walking apparatus. Additionally, these devices are also unable to provide selective versatility with regard to the different types of attachments that can be utilized with a singular attachment device for a portable and handheld walking apparatus.

Therefore, a need exists to overcome the problems with the prior art as discussed above.

SUMMARY OF THE INVENTION

The invention provides a cup holder assembly, or "Audrey" attachment, cup holder, or clamp, for a portable and handheld walking apparatus that overcomes the hereinafore-mentioned disadvantages of the heretofore-known devices and methods of this general type and that effectively, safely and efficiently couples and uncouples with the portable and handheld walking apparatus.

With the foregoing and other objects in view, there is provided, in accordance with the invention, a cup holder assembly that is utilized with a portable (i.e., movable) and handheld (i.e., utilized with a user's hand) walking apparatus having a tubular framing structure. The cup holder assembly includes a fastener assembly with an annular clasp having an upper edge and a lower edge opposing the upper edge of the annular clasp, with a first clamping member, and with a second clamping member coupled together with two clamp fasteners each respectively flanking an annular recess defined by the first and second clamping members. At least one of the first clamping member and the second clamping member is operably configured to selectively translate with respect to one another with the two clamp fasteners to increase and decrease in diameter the annular recess and with a portion of the tubular framing structure of the portable and handheld walking apparatus disposed and compressively retained therein the by first and second clamping members. The cup assembly also includes at least one hinge member assembly directly and hingedly coupled to the annular clasp and operably configured to rotate and have at least one locked position along a rotation path with respect to the annular clasp and a cantilevered support rod coupled to the at least one hinge member assembly. The assembly also includes a container member with a bottom wall, a sidewall surrounding the bottom wall, and a container fastener directly coupled to an outer surface of the sidewall and having a channel with a portion of the cantilevered support rod disposed and compressively retained therein, wherein the bottom wall and the sidewall define a cylindrical container cavity.

In accordance with another feature, an embodiment of the present invention includes the fastener assembly having two wing nuts each respectively coupled to one of the two clamp fasteners and operably configured to rotate and selectively increase and decrease the diameter of the annular recess.

In accordance with yet another feature, an embodiment of the present invention also includes the least one hinge member assembly having a first hinge member directly coupled to the annular clasp and a second hinge member hingedly coupled to the first hinge member and having a portion of the cantilevered support rod directly coupled thereto.

In accordance with a further feature, an embodiment of the present invention also includes a locking nut-fastener assembly interposed between the first and second hinge members.

In accordance with a further feature of the present invention, the second hinge member is operably configured to rotate and have the at least one locked position along the rotation path with the locking nut-fastener assembly.

In accordance with an additional feature, an embodiment of the present invention also includes the locking nut-fastener assembly having a locking nut rotatably coupled to a fastener and at least one washer, wherein the locking nut operably configured to compress the at least one washer to cause the locked position of the second hinge member along the rotation path.

In accordance with a further feature of the present invention, the rotation path includes a first locked position with the cantilevered support rod disposed in a substantially orthogonal orientation and angle with respect to an orientation of the portion of the tubular framing structure disposed and compressively retained by the annular clasp. Further, the rotation path includes a second locked position with the cantilevered support rod disposed in a substantially parallel orientation with respect to an orientation of the portion of the tubular framing structure disposed and compressively retained by the annular clasp.

In another embodiment of the present invention, a cup holder assembly for a portable and handheld walking apparatus includes a fastener assembly with an annular clasp having an upper edge and a lower edge opposing the upper edge of the annular clasp, with a first clamping member, and with a second clamping member coupled together with two clamp fasteners each respectively flanking an annular recess defined by the first and second clamping members, wherein at least one of the first clamping member and the second clamping member operably configured to selectively translate with respect to one another with the two clamp fasteners to increase and decrease in diameter the annular recess. Additionally, the assembly includes a first hinge member directly coupled to the annular clasp and a second hinge member hingedly coupled to the first hinge member, wherein the second hinge member is operably configured to rotate and have at least one locked position along a rotation path with respect to the annular clasp. The cantilevered support rod also includes a portion directly coupled to the second hinge member and having a terminal distal end and a cylindrical container member with a bottom wall, a sidewall surrounding the bottom wall, and a container fastener directly coupled to an outer surface of the sidewall and having a channel shaped and sized to receive the terminal distal end of the cantilevered support rod. The container fastener is operably configured to rotate and compressively retain the cantilevered support rod and the bottom wall and the sidewall defining a cylindrical container cavity.

In another embodiment of the present invention, a cup holder assembly for a portable and handheld walking apparatus is disclosed that includes a fastener assembly with an annular clasp having an upper edge and a lower edge opposing the upper edge of the annular clasp, and is operably configured to selectively translate to increase and decrease in diameter an annular recess defined by the fastener assembly. The assembly includes a first hinge member directly coupled to the annular clasp, a second hinge member hingedly coupled to the first hinge member, and a locking nut-fastener assembly interposed between the first and second hinge members, the second hinge member is operably configured to rotate and have at least one locked position along a rotation path with the locking nut-fastener assembly. Further, a cantilevered support rod is utilized with a portion directly coupled to the second hinge member and having a terminal distal end. The assembly also includes a cylindrical container member with a bottom wall, a sidewall surrounding the bottom wall, and a container fastener directly coupled to an outer surface of the sidewall and having a channel shaped and sized to receive the terminal distal end of the cantilevered support rod, wherein the container fastener is operably configured to rotate and compressively retain the cantilevered support rod and the bottom wall and the sidewall defining a cylindrical container cavity.

Although the invention is illustrated and described herein as embodied in a cup holder assembly, or "Audrey" attachment, cup holder, or clamp, for a portable and handheld walking apparatus, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tubular structure of the portable and handheld walking apparatus or, when applicable, the direction spanning from opposing ends of the cantilevered support rod.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient cup holder assembly 100, also referred to an "Audrey" cup holder or clamp, for a portable and handheld walking apparatus that solves the aforementioned problems resident in the art and that enables users to effectively, safely, and efficiently store canned drinks, bottled drinks, personal items, and other structures. Embodiments of the invention provide various attachments that may be employed with the holder assembly 100 depicted in the figures.

Figure 1:
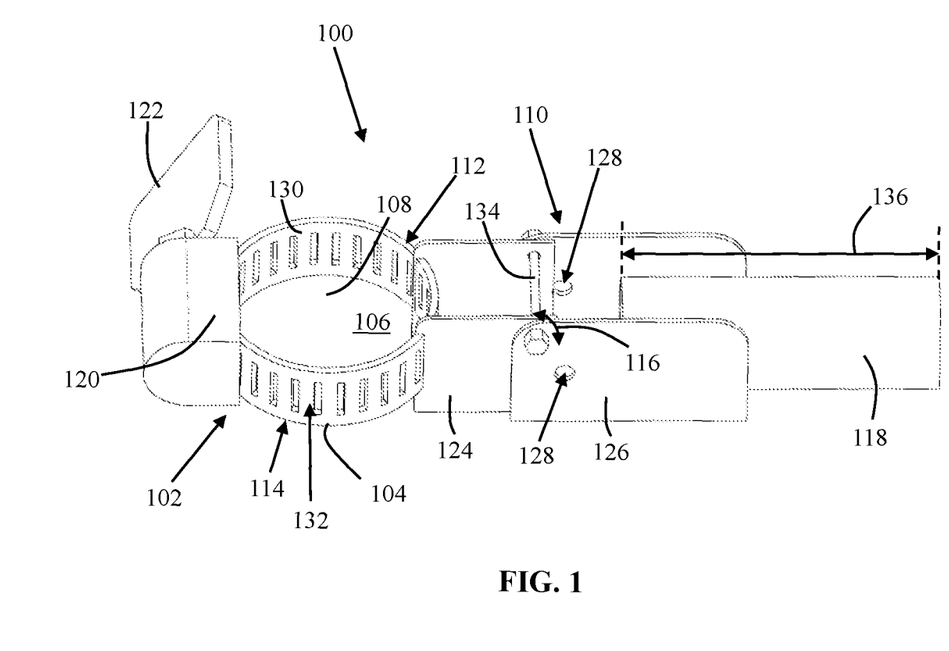
FIG. 1 is a fragmentary perspective view of a cup holder assembly for a portable walking apparatus in accordance with one embodiment of the present invention.
Figure 2:
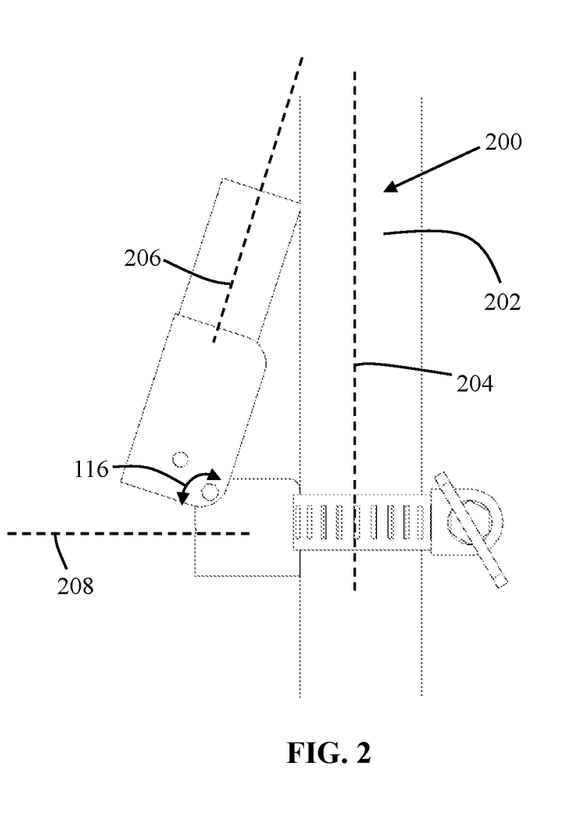
FIG. 2 is a fragmentary elevational view of the cup holder assembly in FIG. 1 coupled to a frame structure of a portable walking apparatus in accordance with one embodiment of the present invention.
Figure 3:
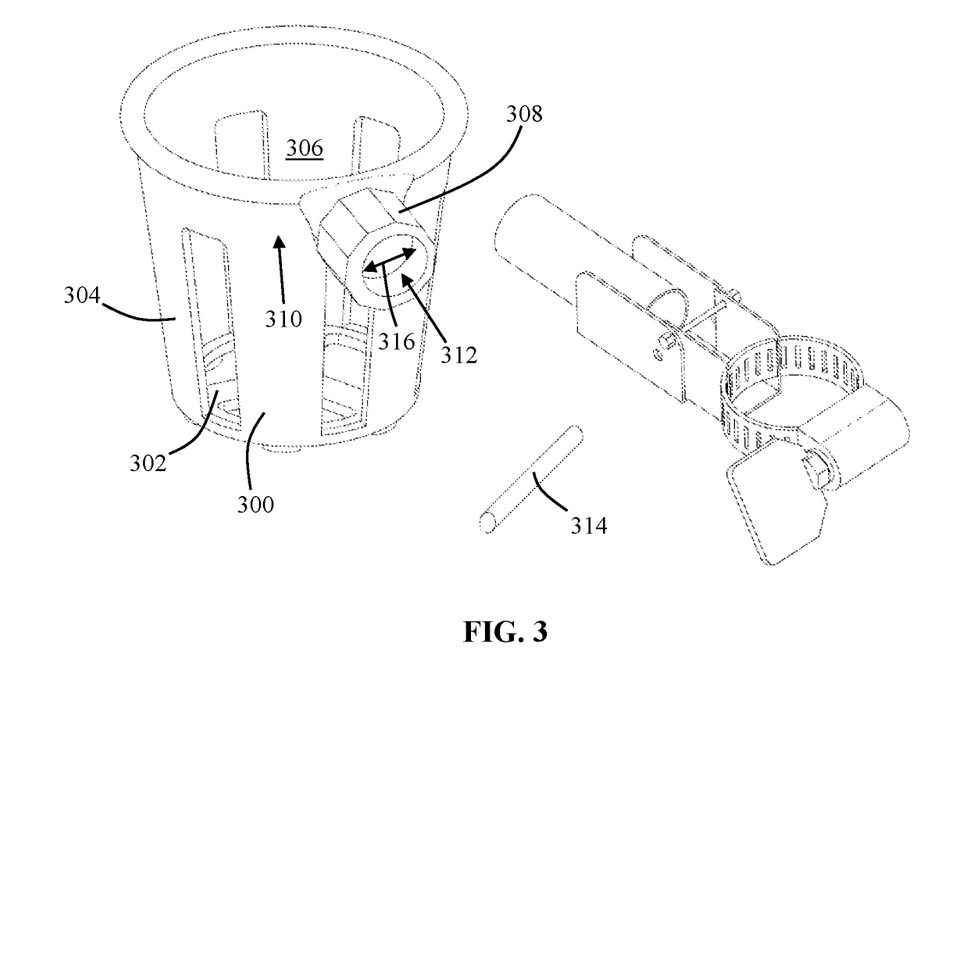
FIG. 3 is a perspective view of a cup holder assembly for a portable walking apparatus in accordance with one embodiment of the present invention.

More specifically, referring to FIGS. 1-3, one embodiment of the present invention is shown in various views. The figures show several advantageous features of the present invention, but, as will be described below, the invention can be provided in several shapes, sizes, combinations of features and components, and varying numbers and functions of the components. The first example of a cup holder assembly 100 for a portable and handheld walking apparatus, as shown in the figures, includes a fastener assembly 102, at least one hinge member assembly 110, a cantilevered support rod 118, and a cylindrical container member 300. As discussed above, the cup holder assembly 100 is beneficially configured for optimal use with a portable and/or handheld walking apparatus, e.g., a crutch, walker, wheelchair, etc. The cup holder assembly 100 also enables quick and effective attachment and removal of the container member 300 and other attachments when desired by the user.

To that end, and with specific reference to an exemplary portable and handheld walking apparatus 200 depicted in FIG. 2, the portable and handheld walking apparatus 200 may have a tubular framing structure 202. In one embodiment, the tubular framing structure 202 may be cylindrical, rectangular, or another shape, but is generally slender and elongated having a dimeter of approximately 0.5-2.5 inches.

With reference to FIGS. 1-2, the fastener assembly 102 can be seen having an annular clasp 104 with an upper edge 112 and a lower edge 114 opposing the upper edge 112 of the annular clasp 104. The annular clasp may define an annular recess 106 operably configured to selectively increase and decrease in diameter 108, e.g., ranging from 0.5-2.d5 inches, to compressively retain and receive a portion of the tubular framing structure 202 of the portable and handheld walking apparatus 200. Beneficially, the annular clasp 104 is configured to provide an opening on a sidewall 130 thereon for inserting the portion of the tubular framing structure 202 within the annular recess 106. As used herein, the term "wall" is intended broadly to encompass continuous structures, as well as, separate structures that are coupled together so as to form a substantially continuous external surface.

The sidewall 130 of the annular clasp 104 may include a plurality of slots thereon when, for example, the fastener assembly 102 employs the use of a worm gear 120 assembly. The worm gear 120 assembly may be operably configured to translate and selectively increase and decrease the diameter 108 of the clamp annular recess 106 to effectuate linear translation on the tubular framing structure 202 (when greater than the diameter of the tubular framing structure 202) or to compressively retain the cup holder assembly 100 to the tubular framing structure 202 (when at least approximately the same diameter of the tubular framing structure 202). The worm gear 120 assembly may employ the use of a substantially planar head 122 operably configured to rotate and translate the worm gear 120 and lock the diameter 108 of the annular clasp 104. Although the worm gear 120 has preferred advantages in light of its application to the elderly and/or the disabled, in other embodiments, another type of mechanism may be utilized to lock the annular clasp 104, e.g., Velcro, tongue-and-groove, etc.

The cup holder assembly 100 can be seen also having at least one hinge member assembly 110 directly and hingedly coupled to the annular clasp 104, e.g., at the outer surface 132 of the sidewall 130. The at least one hinge member assembly 110 may be welded to the annular clasp 104. In other embodiments, the at least one hinge member assembly 110 may be adhered to the annular clasp 104 or may utilize one or more fastener(s). The at least one hinge member assembly 110 is operably configured to rotate and have at least one locked position along a rotation path (represented with arrow 116 in FIG. 1) with respect to the upper edge 112 of the annular clasp 104.

The least one hinge member assembly 110 preferably consists of a first hinge member 124 directly coupled to the annular clasp 104 and a second hinge member 126 hingedly coupled to the first hinge member 124. The first and second hinge members 124, 126 may have plate-like structures as seen in the figures and may be of a U-shape or parallel-plate configuration to permit entry and egress of adjacent hinge members 124, 126. The first and second hinge members 124, 126 may be hingedly coupled together utilizing a pivot pin 134. The second hinge member 126 may have a portion of the cantilevered support rod 118 directly coupled thereto, e.g., using a welding, adhesion, etc.

In one preferred embodiment, the at least one hinge member assembly 110 may be placed in the at least one locked position along the rotation path 116 using a cylindrical locking pin 314 shaped and sized to be inserted within a through hole 128 defined by either or both of the first and second hinge members 124, 126. As such, the cup holder assembly 100 is operably configured to have a configuration with the cantilevered support rod 118 locked in place to support the weight of the container member 300. In one embodiment, the cylindrical locking pin 314 may be tethered to one of the hinge members 124, 126, e.g., at one of its opposing ends, to prevent misplacement of the cylindrical locking pin 314 when not in use. The cylindrical locking pin 314 may also include an aperture at or proximal to one of the ends for receiving a cotter hairpin or other locking fastener, thereby preventing inadvertent dislodgement of the cylindrical locking pin 314. The cylindrical locking pin 314 may be circular or oblong in shape but is specially designed to prevent rotational movement of the at least one hinge member assembly 110. In other embodiments, a retractable flange or tongue-and-groove configuration may be utilized to place the at least one hinge member assembly 110 in the at least one locked position along the rotation path 116. As best seen in FIG. 2, another position along the rotation path 116 is depicted, i.e., adjacent to or touching the tubular framing structure 202.

Said another way, the second hinge member 126 is operably configured to rotate and have the locked position along the rotation path with the cylindrical locking pin 314 disposed within the through hole 128. Furthermore, the rotation path 116 may include a first locked position (FIG. 1) with the cantilevered support rod 118 disposed in a substantially orthogonal orientation and angle, i.e., 90°+/− approximately 15°, with respect to an orientation of the portion of the tubular framing structure 202 disposed and compressively retained by the annular clasp 104. Additionally, the rotation path 116 may also include a second locked position (FIG. 2) with the cantilevered support rod 118 disposed in a substantially parallel orientation, i.e., 0°+/− approximately 15°, with respect to an orientation of the portion of the tubular framing structure 202 disposed and compressively retained by the annular clasp 104. The tubular framing structure 202 can be seen having an axis 204 that may be substantially orthogonal with respect to the axis 206 of the cantilevered support rod 118 when in the first locked position and substantially parallel with respect to the axis 208 of the cantilevered support rod 118 when in the second locked position.

As seen in the figures, the cantilevered support rod 118 may couple to the at least one hinge member assembly 110, e.g., the second hinge member 126. The cantilevered support rod 118 may be approximately 1-6 inches in length 136 and may extend a total of approximately 3-8 inches from the outer surface 132 of the clasp 104. Dimensions outside of said ranges, however, are contemplated based on the design application of the cup holder assembly 100.

An exemplary cylindrical container member 300 is also depicted in FIG. 3. The cylindrical container member 300 includes a bottom wall 302, a sidewall 304 surrounding the bottom wall 302, and a container fastener 308 directly coupled to an outer surface 310 of the sidewall 304. The sidewall 304 and the bottom wall 302 may include slots or may be continuous and solid, depending on the design configuration. While the cylindrical container member 300 is a preferred embodiment and attachment for the cantilever support rod 118, other advantageous attachments are contemplated. For example, a substantially rigid plate having an upper and/or lower planar surface may be employed to support a dinner plate or other structure desired by the user. Like container member 300, the rigid plate may include a container fastener 308 and may have a channel 312 with a portion of the cantilevered support rod 118 disposed and compressively retained therein. Said differently, the channel 312 may be sized and shaped to receive a portion of the cantilevered support rod 118. That said, when a sidewall 304 is utilized with a bottom wall 302, the bottom wall 302 and the sidewall 304, namely the inner surfaces thereof, may define a container cavity 306, which may also be cylindrical.

As seen in FIG. 3, the container fastener 308 is operably configured to rotate and selectively increase and decrease a diameter 316 of the channel 312 of the container fastener 308, thereby compressively coupling the container member 300 to the cantilevered support rod 118. In other embodiments, a non-compression fastener may be utilized to lock the container member 300 in place. In one embodiment, the outer surface of the cantilevered support rod 118 and inner surface of the container fastener 308 may be circular surrounding a perimeter thereon, thereby enabling the user to quickly, effectively, and selectively rotate the container member 300 on the cantilevered support rod 118 to a desired angle.

When the container member 300 is not desired to be used, the user can quickly rotate the container fastener 308 in an opposite direction to remove the compression and remove the container member 300 from the cantilevered support rod 118. Removal of the annular clasp 104 is also easily effectuated through use of the fastener 120. Although a specific order of executing the installation and removal of components of the cup holder assembly have been disclosed and/or depicted, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

Figure 4:
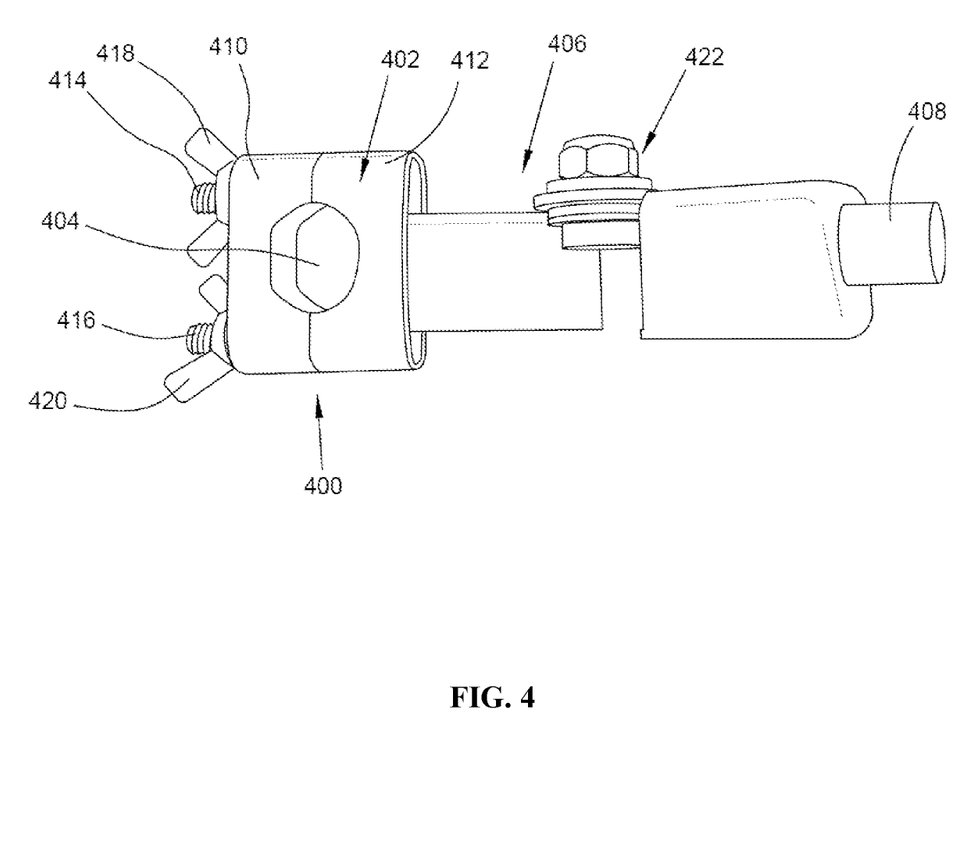
FIG. 4 is a fragmentary perspective view of a cup holder assembly for a portable walking apparatus in accordance with another embodiment of the present invention.
Figure 5:
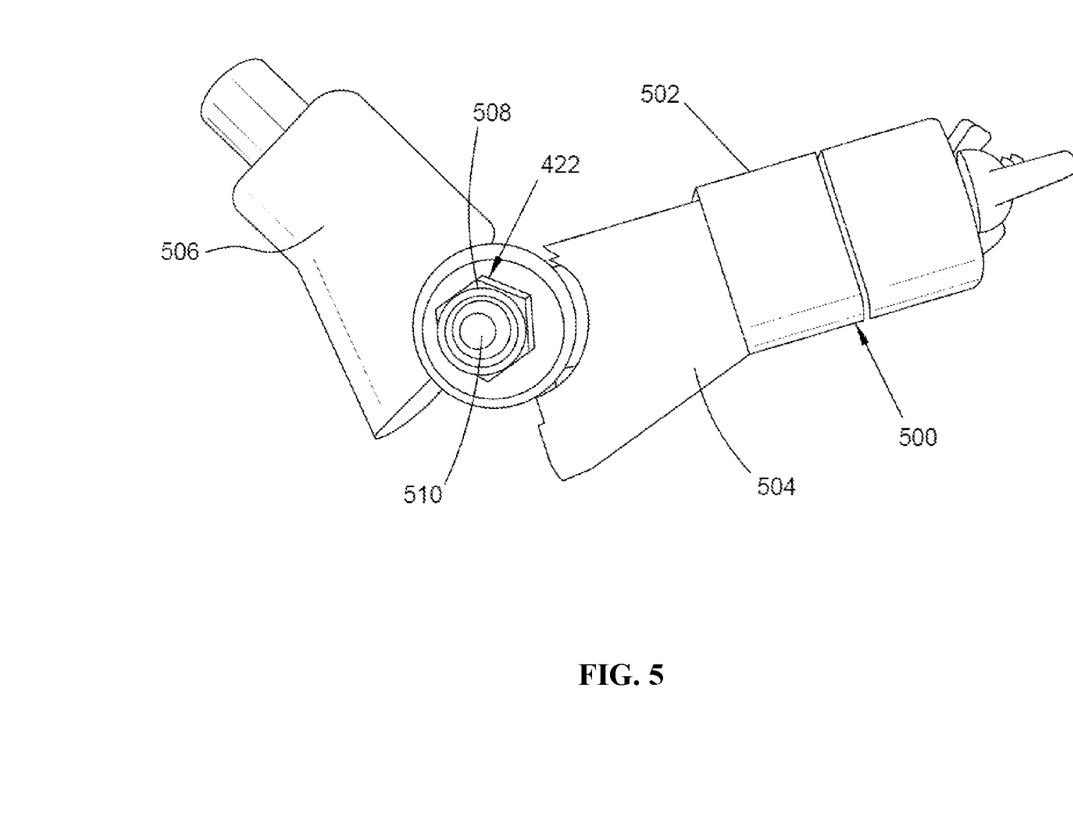
FIG. 5 is an overhead perspective side view of the cup holder assembly in FIG. 4 in a position along a rotation path in accordance with one embodiment of the present invention.
Figure 6:
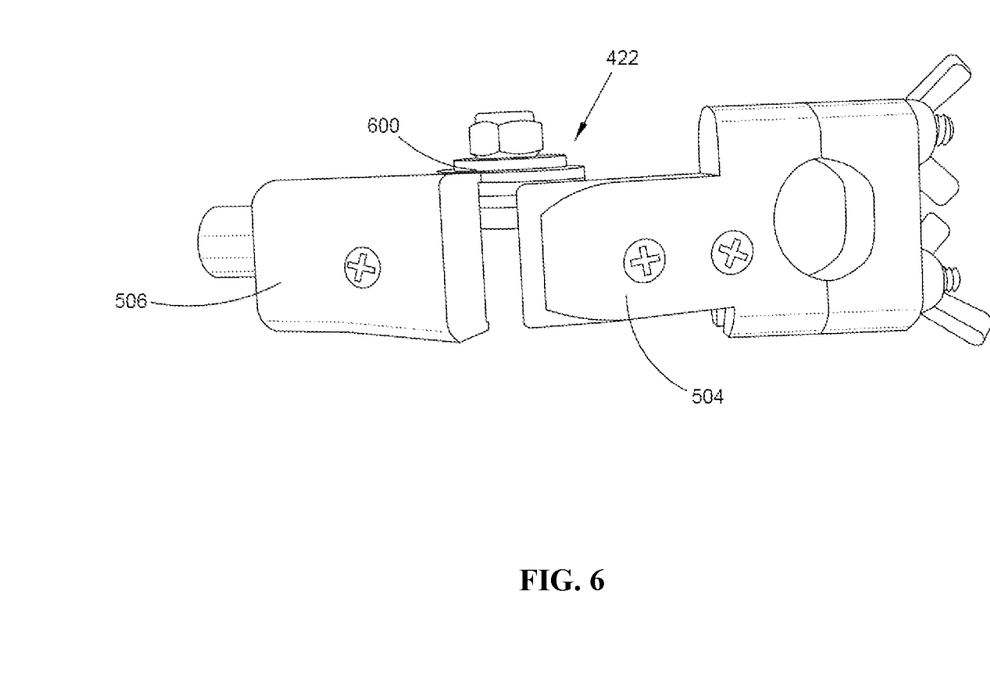
FIG. 6 is an overhead perspective front view of the cup holder assembly in FIG. 4 in position along a rotation path in accordance with one embodiment of the present invention.

Additionally, another embodiment of the present invention is depicted in FIGS. 4-6, wherein said cup holder assembly has many of the same features and functionality of the assembly 100 depicted in FIGS. 1-3, including its use with the container member 300 depicted in FIG. 3 and its ability to advantageously couple with a portable and hand-held walking apparatus having a tubular framing structure. More specifically, the cup assembly includes a fastener assembly 400 with an annular clasp 402 having an upper edge 500 and a lower edge 502 opposing the upper edge 500 of the annular clasp 402. Additionally, however, the cup assembly includes a first clamping member 410 and a second clamping member 412 coupled together with clamp fastener 414, 416 (e.g., screws) each respectively flanking 416 an annular recess 404 defined by the first and second clamping members 410, 412. The first and second clamping members 410, 412 may be of a metallic, hard plastic (e.g., PVC), or other substantially rigid material operably configured to maintain its shape upon experiencing compression forces of at least 10 lbs.

One or both of the first and second clamping members 410, 412 are preferably operably configured to selectively translate with respect to one another with the two clamp fasteners 414, 416 to increase and decrease in diameter the annular recess 404 (discussed above). The translation of the first and second clamping member(s) 410, 412 will enclose (partially or completely) a portion of the tubular framing structure of the portable and handheld walking apparatus and compressively retain it within the annular recess 404.

Additionally, the assembly also includes at least one hinge member assembly 406 directly and hingedly coupled to the annular clasp 402 and operably configured to rotate and have at least one locked position along a rotation path (exemplified with arrow 512) with respect to the annular clasp 402. Different locked positions can be seen exemplified at least in FIGS. 4-6. The cantilevered support rod 408 can be seen coupled to the at least one hinge member assembly 406, wherein the support rod 408 is operably configured to be couplable to a container member. The container member may include a bottom wall, a sidewall surrounding the bottom wall, and a container fastener directly coupled to an outer surface of the sidewall and having a channel with a portion of the cantilevered support rod disposed and compressively retained therein, wherein the bottom wall and the sidewall defining a cylindrical container cavity.

In additional embodiments, the fastener assembly 400 includes two wing nuts 418, 420 each respectively coupled to one of the two clamp fasteners 414, 416 and operably configured to rotate and selectively increase and decrease the diameter of the annular recess 404. The assembly 400 may also include a first hinge member 504 directly coupled to the annular clasp and a second hinge member 506 hingedly coupled to the first hinge member 504 and having a portion of the cantilevered support rod 408 directly coupled thereto. Additionally, the locking nut-fastener assembly 422 may be beneficially interposed between the first and second hinge members 504, 506 to enable selective rotation thereof. The second hinge member 506 may then be operably configured to rotate and have the at least one locked position along the rotation path with the locking nut-fastener assembly 422.

In one embodiment, the at least one locked position along the rotation path includes utilizing a locking nut-fastener assembly 422 that has a locking nut 508 rotatably coupled to a fastener 510 and at least one washer 600. The locking nut 508 is operably configured to compress the at least one washer 600 to cause the locked position of the second hinge member 506 along the rotation path. The rotation path may beneficially include a first locked position with the cantilevered support rod disposed in a substantially orthogonal orientation and angle with respect to an orientation of the portion of the tubular framing structure disposed and compressively retained by the annular clasp. The rotation path also includes a second locked position with the cantilevered support rod disposed in a substantially parallel orientation with respect to an orientation of the portion of the tubular framing structure disposed and compressively retained by the annular clasp.

Additionally, various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. In combination with a portable and handheld walking apparatus having a tubular framing structure, wherein the improvement comprises:
    a cup holder assembly having:
    a fastener assembly with an annular clasp having an upper edge and a lower edge opposing the upper edge of the annular clasp, with a first clamping member, and with a second clamping member coupled together with two clamp fasteners each respectively flanking an annular recess defined by the first and second clamping members, at least one of the first clamping member and the second clamping member operably configured to selectively translate with respect to one another with the two clamp fasteners to increase and decrease in diameter the annular recess and with a portion of the tubular framing structure of the portable and handheld walking apparatus disposed and compressively retained therein the by first and second clamping members;
    at least one hinge member assembly directly and hingedly coupled to the annular clasp and operably configured to rotate and have at least one locked position along a rotation path with respect to the annular clasp;
    a cantilevered support rod coupled to the at least one hinge member assembly; and
    a container member with a bottom wall, a sidewall surrounding the bottom wall, and a container fastener directly coupled to an outer surface of the sidewall and having a channel with a portion of the cantilevered support rod disposed and compressively retained therein, the bottom wall and the sidewall defining a cylindrical container cavity.

2. The improvement according to claim 1, wherein the fastener assembly further comprises:
    two wing nuts each respectively coupled to one of the two clamp fasteners and operably configured to rotate and selectively increase and decrease the diameter of the annular recess.

3. The improvement according to claim 1, wherein the least one hinge member assembly further comprises:
    a first hinge member directly coupled to the annular clasp and a second hinge member hingedly coupled to the first hinge member and having a portion of the cantilevered support rod directly coupled thereto.

4. The improvement according to claim 3, further comprising:
    a locking nut-fastener assembly interposed between the first and second hinge members.

5. The improvement according to claim 4, wherein:
    the second hinge member is operably configured to rotate and have the at least one locked position along the rotation path with the locking nut-fastener assembly.

6. The improvement according to claim 5, wherein the locking nut-fastener assembly further comprises:
    a locking nut rotatably coupled to a fastener and at least one washer, the locking nut operably configured to compress the at least one washer to cause the locked position of the second hinge member along the rotation path.

7. The improvement according to claim 6, wherein:
    the rotation path includes a first locked position with the cantilevered support rod disposed in a substantially orthogonal orientation and angle with respect to an orientation of the portion of the tubular framing structure disposed and compressively retained by the annular clasp.

8. The improvement according to claim 7, wherein:
    the rotation path includes a second locked position with the cantilevered support rod disposed in a substantially parallel orientation with respect to an orientation of the portion of the tubular framing structure disposed and compressively retained by the annular clasp.

9. A cup holder assembly for a portable and handheld walking apparatus comprising:
    a fastener assembly with an annular clasp having an upper edge and a lower edge opposing the upper edge of the annular clasp, with a first clamping member, and with a second clamping member coupled together with two clamp fasteners each respectively flanking an annular recess defined by the first and second clamping members, at least one of the first clamping member and the second clamping member operably configured to selectively translate with respect to one another with the two clamp fasteners to increase and decrease in diameter the annular recess;
    a first hinge member directly coupled to the annular clasp and a second hinge member hingedly coupled to the first hinge member, the second hinge member operably configured to rotate and have at least one locked position along a rotation path with respect to the annular clasp;
    a cantilevered support rod with a portion directly coupled to the second hinge member and having a terminal distal end; and
    a cylindrical container member with a bottom wall, a sidewall surrounding the bottom wall, and a container fastener directly coupled to an outer surface of the sidewall and having a channel shaped and sized to receive the terminal distal end of the cantilevered support rod, the container fastener operably configured to rotate and compressively retain the cantilevered support rod and the bottom wall and the sidewall defining a cylindrical container cavity.

10. The cup holder assembly according to claim 9, wherein the fastener assembly further comprises:
two wing nuts each respectively coupled to one of the two clamp fasteners and operably configured to rotate and selectively increase and decrease the diameter of the annular recess.

11. The cup holder assembly according to claim 10, wherein:
the annular recess is operably configured to selectively increase and decrease in diameter ranging from 0.5-2.5 inches.

12. The cup holder assembly according to claim 11, further comprising:
a locking nut-fastener assembly interposed between the first and second hinge members.

13. The cup holder assembly according to claim 12, wherein:
the second hinge member is operably configured to rotate and have the at least one locked position along the rotation path with the locking nut-fastener assembly.

14. The cup holder assembly according to claim 13, wherein the locking nut-fastener assembly further comprises:
a locking nut rotatably coupled to a fastener and at least one washer, the locking nut operably configured to compress the at least one washer to cause the locked position of the second hinge member along the rotation path.

15. The cup holder assembly according to claim 14, wherein:
the rotation path includes a first locked position with the cantilevered support rod disposed in a substantially orthogonal orientation and angle with respect to an orientation of the portion of the tubular framing structure disposed and compressively retained by the annular clasp.

16. A cup holder assembly for a portable and handheld walking apparatus comprising:
a fastener assembly with an annular clasp having an upper edge and a lower edge opposing the upper edge of the annular clasp, and having a first clamping member and a second clamping member coupled together with two clamp fasteners each respectively flanking an annular recess defined by the first and second clamping members, wherein at least one of the first clamping member and the second clamping member are operably configured to selectively translate with respect to one another to increase and decrease in diameter the annular recess;
a first hinge member directly coupled to the annular clasp, a second hinge member hingedly coupled to the first hinge member, and a locking nut-fastener assembly interposed between the first and second hinge members, the second hinge member is operably configured to rotate and have at least one locked position along a rotation path with the locking nut-fastener assembly;
a cantilevered support rod with a portion directly coupled to the second hinge member and having a terminal distal end; and
a cylindrical container member with a bottom wall, a sidewall surrounding the bottom wall, and a container fastener directly coupled to an outer surface of the sidewall and having a channel shaped and sized to receive the terminal distal end of the cantilevered support rod, the container fastener operably configured to rotate and compressively retain the cantilevered support rod and the bottom wall and the sidewall defining a cylindrical container cavity.

\* \* \* \* \*